UNITED STATES PATENT OFFICE.

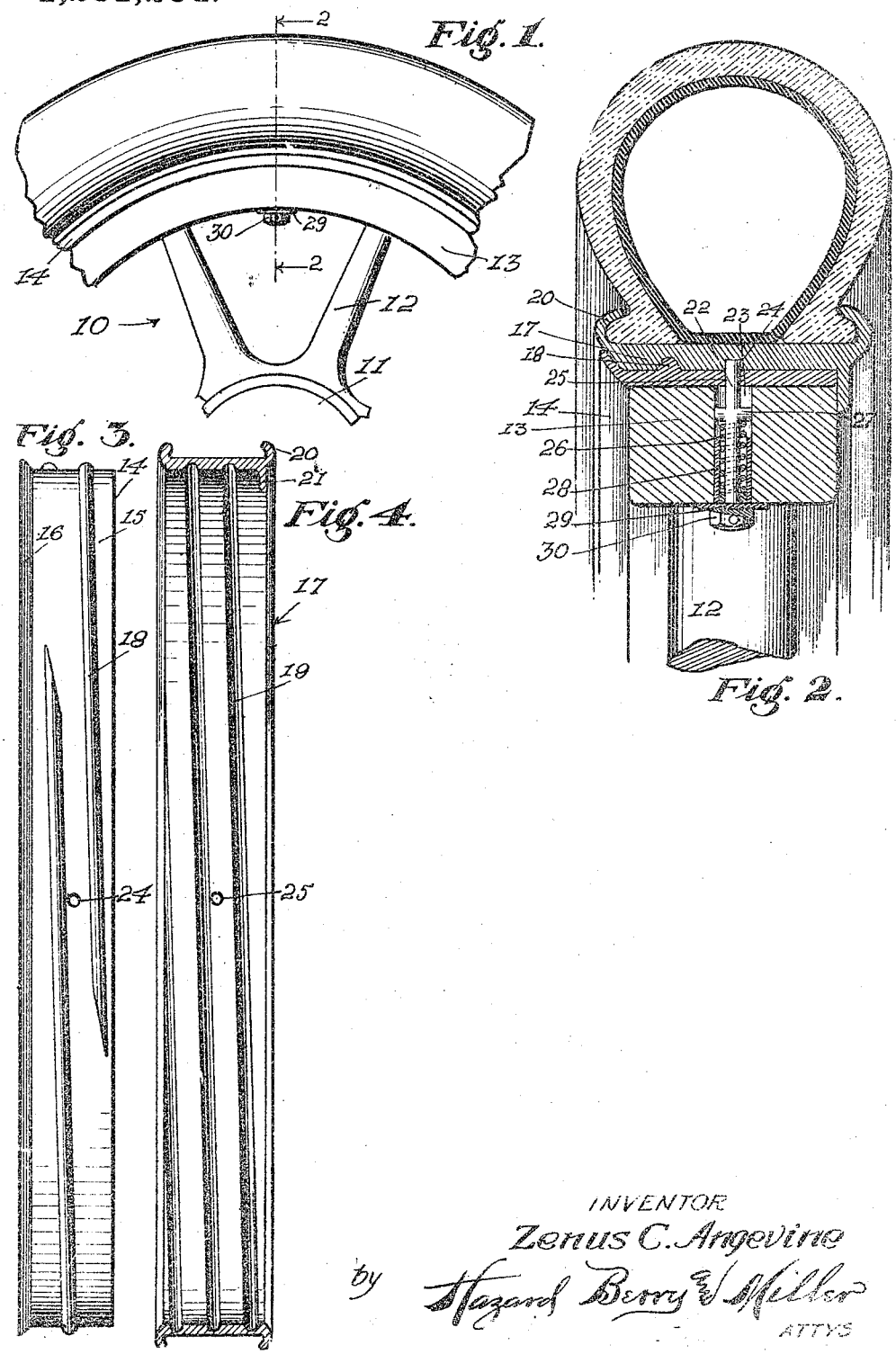

ZENUS C. ANGEVINE, OF LONG BEACH, CALIFORNIA.

DEMOUNTABLE WHEEL-RIM.

1,281,264.      Specification of Letters Patent.      Patented Oct. 15, 1918.

Application filed June 21, 1916. Serial No. 105,079.

*To all whom it may concern:*

Be it known that I, ZENUS C. ANGEVINE, a subject of the King of Great Britain, residing at Long Beach, in the county of Los Angeles and State of California, have invented new and useful Improvements in Demountable Wheel-Rims, of which the following is a specification.

My object is to make a demountable rim for a vehicle wheel carrying a pneumatic tire.

Figure 1 is a view in side elevation of a fragmentary portion of a vehicle wheel equipped with the demountable rim.

Fig. 2 is a view in vertical section as seen on the line 2—2 of Fig. 1 and particularly illustrates the correlation between the tire band and the demountable rim as well as illustrating the construction of the locking member.

Fig. 3 is a view in elevation of the tire band and particularly shows the engaging thread thereupon.

Fig. 4 is a view in vertical section of the demountable rim and is intended to clearly illustrate the arrangement of the thread members around its inner periphery.

Referring to the drawings more particularly, 10 indicates a vehicle wheel provided with a hub 11 and spokes 12, the spokes 12 being fitted with an annular wheel felly 13 which is formed as is common in vehicle wheel construction. It is here noted that this wheel need not necessarily be specially designed but is preferably a wheel of the artillery type as is commonly used upon motor vehicles.

Mounted upon the felly of the wheel is an annular felly band 14 which, as particularly illustrated in Fig. 3 of the drawings, is formed with an annular body or ring portion 15 adapted to conform to the outer periphery of the felly and which has an outturned flange member 16 which acts as a stop for a demountable rim 17 which is adapted to be positioned over the ring portion 16. The ring 16 is formed with a spiral thread 18 which is raised upon the face of the rim and is adapted to be engaged by a complementary thread 19 formed around the inner periphery of the demountable rim 17. It will be noted that this thread is provided with a considerable lead so that the rim may be quickly positioned upon the felly band. The rim, as particularly shown in Fig. 4 of the drawings, is formed with tire engaging flanges 20 which extend outwardly from it and an inner flange portion 21 which is adapted to lie flush against the side of the wheel felly and act to prevent dirt from working its way between the band and rim members and thus making it difficult to separate them.

When the demountable rim is in position upon the felly band, as indicated in Fig. 2 of the drawings, they may be so locked by means of a locking device which is composed of a locking pin 22 adapted to reciprocate within a bore 23 extending radially through the wheel felly. The pin 22, when in its locked position, extends through an opening 24 formed within the felly band and further engages an opening 25 formed upon the inner face of the clencher rim. The pin is normally held in register with these two openings by means of a coil spring 26 which bears against a collar 27 formed upon the pin and rests with its opposite end upon the end wall of a sleeve 28 which extends upwardly within the bore 23 and is secured in a suitable manner to the felly. The end wall of the sleeve 28 is formed with a circular projection 29 which surrounds the pin and has its inner face disposed at an inclination to the longitudinal center of the pin. This face registers with an inclined face formed on the wing nut 30 and insures that the pin will be readily withdrawn from its locking position by a half turn of the nut.

In the operation, when the rim is to be mounted upon the wheel, it is placed over the felly band and into engagement with the thread 18 formed thereon. The threads 18 register with threads 19 and when the demountable rim is turned it will cause it to be screwed upon the felly band and drawn with its inner flange against the flange 16 on the felly band, after which it is locked by means of the pin 22 which snaps through the opening 24 and registers with the depression 25 in the clencher rim.

It will thus be seen that the demountable rim here disclosed is simple in construction and may be readily applied to a vehicle wheel and there secured in a positive manner.

I claim:

A demountable rim construction comprising a felly, a felly band upon the felly, an outwardly extending retaining flange integral with one edge of the felly band, a screw-thread upon the periphery of the felly band, a rim screwed upon the felly band, an inturned flange integral with the rim and fitting the opposite edge of the felly band from the retaining flange, a sleeve mounted radially through the felly, a circular projection upon the sleeve engaging the inner face of the felly; said circular projection having a windingly inclined face; a pin slidingly mounted in the sleeve and extending through the felly band into a recess in the rim, a spring in the sleeve and connected to the pin to press the pin inwardly, and a nut upon the head of the pin and having an inclined face fitting the inclined face of the sleeve; so that when the nut is rotated one way the pin is withdrawn to release the rim and when the nut is rotated the other way the spring presses the pin inwardly to lock the rim.

In testimony whereof I have signed my name to this specification.

ZENUS C. ANGEVINE.